(12) United States Patent
Johnson et al.

(10) Patent No.: US 12,539,030 B2
(45) Date of Patent: Feb. 3, 2026

(54) ATTACHMENT MECHANISM FOR MEDICAL DEVICE

(71) Applicant: Nuvaira, Inc., Minneapolis, MN (US)

(72) Inventors: Philip Johnson, Plymouth, MN (US); Ryan Kaveckis, Minneapolis, MN (US); Lawrence Wales, Maplewood, MN (US)

( * ) Notice: Subject to any disclaimer, the term of this patent is extended or adjusted under 35 U.S.C. 154(b) by 33 days.

(21) Appl. No.: 18/517,829

(22) Filed: Nov. 22, 2023

(65) Prior Publication Data

US 2024/0164633 A1     May 23, 2024

Related U.S. Application Data

(60) Provisional application No. 63/384,890, filed on Nov. 23, 2022.

(51) Int. Cl.
*A61B 1/267*      (2006.01)
*A61B 1/00*       (2006.01)

(52) U.S. Cl.
CPC ........ *A61B 1/2676* (2013.01); *A61B 1/00128* (2013.01); *A61B 2560/04* (2013.01)

(58) Field of Classification Search
CPC ... A61B 1/2676; A61B 1/00128; A61B 1/267; A61B 2560/04
See application file for complete search history.

(56) References Cited

U.S. PATENT DOCUMENTS

| | | | |
|---|---|---|---|
| 4,332,402 A | 6/1982 | Shellhause | |
| 4,398,757 A | 8/1983 | Floyd et al. | |
| 4,451,069 A | 5/1984 | Melone | |
| 2009/0088600 A1* | 4/2009 | Meloul | A61B 1/2676 600/154 |
| 2013/0167841 A1 | 7/2013 | Sheffer et al. | |

FOREIGN PATENT DOCUMENTS

| | | | |
|---|---|---|---|
| WO | 2012125192 A1 | 9/2012 | |
| WO | WO-2017210333 A1 * | 12/2017 | ......... A61B 10/0283 |

OTHER PUBLICATIONS

International Search Report and Written Opinion corresponding to PCT/US2023/080908, dated Mar. 25, 2024.

\* cited by examiner

*Primary Examiner* — Gerald Johnson
(74) *Attorney, Agent, or Firm* — Husch Blackwell LLP

(57) ABSTRACT

An attachment mechanism configured to couple to a receiving port of a bronchoscope, the attachment mechanism including an adapter segment having a tubular body having an inner lumen and distal end, where the distal end includes a plurality of axial slits positioned circumferentially around the distal end to define a flexible tab section, where the flexible tab section defined a recess within the inner lumen configured to receive and mechanically interlock with the receiving port of the bronchoscope; and a slide lock positioned over the tubular body configured to slide over the tubular body between a first position that allows flexible tab section to flex radially outward to receive the receiving port within the recess, and a second position where slide lock restrains the radial expansion of flexible tab section.

6 Claims, 3 Drawing Sheets

ATTACHMENT MECHANISM FOR MEDICAL DEVICE

CROSS-REFERENCE TO RELATED APPLICATIONS

The present disclosure claims the benefit of U.S. Provisional Application No. 63/384,890, filed Nov. 23, 2022, the complete disclosure of which is hereby incorporated by reference.

TECHNICAL FIELD

This invention pertains to an apparatus used as an attachment mechanism to couple a tool, such as a treatment catheter, to another medical device, such as a bronchoscope.

BACKGROUND

Bronchoscopy is a common medical procedure within the pulmonary arts which involves inserting a bronchoscope into an airway of a patient. The bronchoscope itself generally includes a flexible elongated body defining an inner access lumen and an illumination and/or imaging system about the distal end of the elongated body. The inner lumen provides access for additional tools such as diagnostic or therapeutic devices that are introduced through a port about the proximal end of the bronchoscope and traversed through the inner lumen to a target treatment location. The ability to physically attach such diagnostic, therapeutic, or other type of devices to the bronchoscope can be important to secure the two devices together while allowing the physician to maneuver the tools relative to one another as needed.

SUMMARY OF THE DISCLOSURE

The disclosure describes a convenient and efficient attachment mechanism for attaching a therapeutic, diagnostic, or other medical device such as a treatment catheter (collectively referred to as a medical device) to a bronchoscope. The attachment mechanism may provide a quick and efficient means to couple to the two devices together while still permitting the relative rotation motion between the medical device and the bronchoscope port.

In some embodiments the disclosure describes an attachment mechanism configured to couple to a receiving port of a bronchoscope, the attachment mechanism including an adapter segment having a tubular body having an inner lumen and distal end, where the distal end includes a plurality of axial slits positioned circumferentially around the distal end to define a flexible tab section, where the flexible tab section defined a recess within the inner lumen configured to receive and mechanically interlock with the receiving port of the bronchoscope; and a slide lock positioned over the tubular body configured to slide over the tubular body between a first position that allows flexible tab section to flex radially outward to accommodate the receiving port within the recess, and a second position where slide lock restrains the radial expansion of flexible tab section.

The above summary of the invention is not intended to describe each illustrated embodiment or every implementation of the present invention. The detailed description that follows more particularly exemplifies these embodiments.

Figure 1:
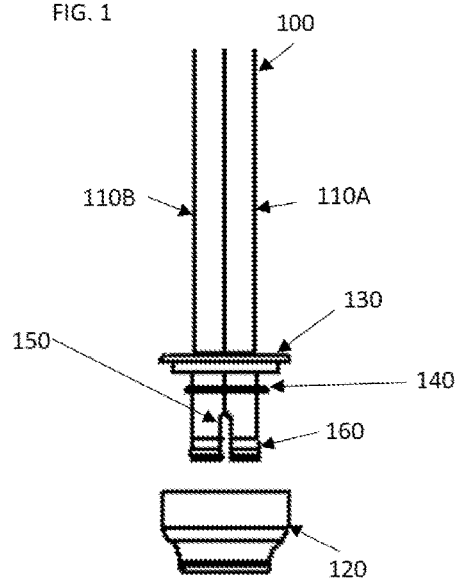
FIG. 1 is a side view of the attachment mechanism.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Figure 2:
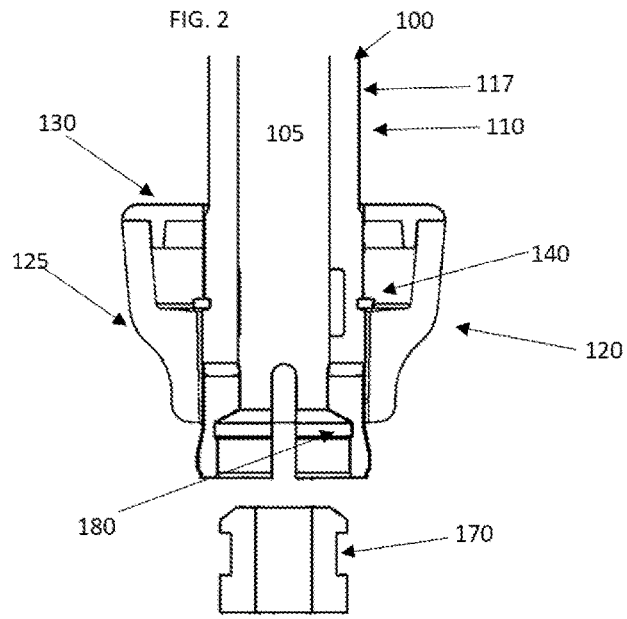
FIG. 2 is a cross sectional view of the attachment mechanism showing axial alignment with the port of a bronchoscope.
Figure 3:
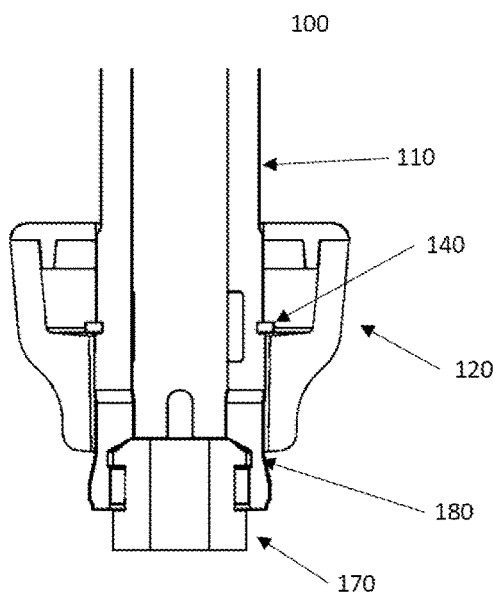
FIG. 3 is a cross sectional view of the attachment mechanism coupled with the port of a bronchoscope in an unlocked configuration.
Figure 4:
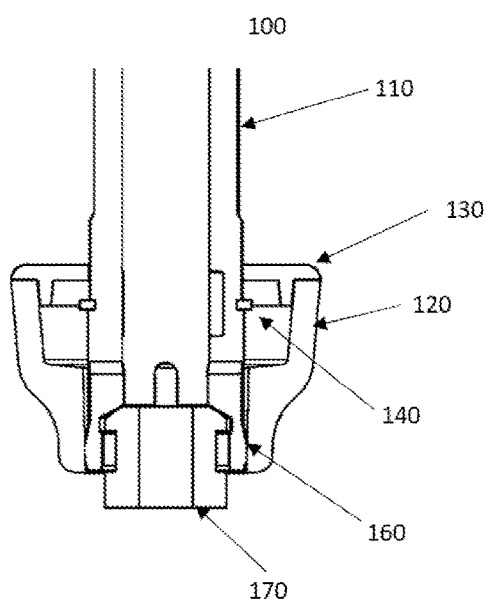
FIG. 4 is a cross sectional view of the attachment mechanism coupled with the port of a bronchoscope in a locked configuration.

FIG. 1 is a side view of the disclosed attachment mechanism 100, while FIGS. 2-4 are cross sectional views of attachment mechanism 100 at various stages of being coupled to the port 170 of a bronchoscope 190. Attachment mechanism 100 may be used to connect and secure a medical device such as a treatment catheter (e.g., device 200 discussed further below) to bronchoscope 190 while still permitting some degree of relative movement between the components (e.g., rotation or axial movement of the treatment catheter).

Attachment mechanism 100 includes a 2-piece adapter 110 that includes shaft components 110A and 110B, a coupler section 125, a back plate 130, and a spring clip 140. The 2-piece adapter includes components 110A and 110B that align longitudinally with one another and collectively define an inner lumen 105 configured to receive a medical device (e.g., treatment catheter). Components 110A and 110B may each be cylindrical shaped (e.g., each forming half a cylinder) that are held together by a spring clip 140. In some examples, components 110A and 110B can be coupled to the handle assembly (e.g., handle assembly 204) of the medical device 200.

The distal portion of components 110A and 110B include a flexible tab section 160 configured to fit over bronchoscope port 170 to allow access there through. Flexible tab section 160 provides a resilient material that allows the distal opening of components 110A and 110B to deflect radially outward. To help facilitate this movement, tab section 160 includes a plurality of vertically cut slots 150 spaced circumferentially about the distal ends of the 2-piece adapter 110A, 110B. Slots 150 permit flexible tab section 160 to elastically deform and expand radially outward to receive the tapered end of bronchoscope port 170. The inner recess of tab section 160 defines an interlocking recess 180 configured to mate with port 170. Upon receipt and seating between port 170 and tab section 160, the resilient nature of tab section 160 returns to the resting position to create a mechanical interlock between port 170 and recess 180. The size of slots 150 along with the material properties of tab section 160 determines the amount of flex of tab section 160 and force needed to couple and remove attachment mechanism 100 from bronchoscope 190.

In some embodiments, to help facilitate the connection with port 170, the distal end of adapter components 110A and 110B may have an increased inner and outer diameter compared to a more proximal section 117. Thus, tab section 160 may have a larger diameter (both inner and outer) than proximal section 117 of components 110A and 110B. The increased diameter can help accommodate the internal recess 180 that mates with the bronchoscope port 170 to create a mechanical interlock with the port 170 without causing the sidewall thickness of adapter pieces 110A and 110B to become detrimentally thin in tab section 160. Further having the larger diameter at tab section 160 may also permit a smooth lumen diameter transition between the lumen diameter of adapter components 110A and 110B (e.g., diameter at 117) and the lumen diameter of port 170. In some embodiments, the lumen diameter of adapter components 110A and 110B may be about the same as the lumen diameter of port 170.

The internal recess 180 of tab section 160, and port 170 may comprise complementary interlocking structures such that once port 170 is properly seated within recess 180 the two components will not separate absent an external force to pull the components apart. In some examples both recess 180 and port 170 may have a circular profile. The circular profiles of the two components may allow adapter 110A and 110B to rotate about the longitudinal axis relative to port 170 while being properly seated without becoming dislodge or catching. Such symmetrical design may allow the physician to rotate the medical device 200 containing attachment mechanism 100 relative to bronchoscope 190 after coupling the two components together via attachment mechanism 100.

With port 170 seated and mechanically interlocked within recess 180, port 170 and section 160 can be separated by a pulling force provided attachment mechanism 100 is in the unlocked position (FIG. 3) and not in a locked position (FIG. 4). Such a pulling force while in the unlocked positions radially flexes tab section 160 outward allowing the attachment mechanism 100 and bronchoscope 190 to separate. To prevent unintended separation, coupler 125 and back plate 130 couple together and collectively function as slide lock 120 to inhibit the separation of lock port 170 within recess 180. As shown in FIG. 2, slide lock 120 is positioned over the adapter components 110A and 110B with the spring clip 140 captured within the cavity defined by slide lock 120 allowing for axial movement (e.g., parallel to the central axis) of slide lock 120 relative to adapter components 110A and 110B. Slide lock 120 is configured to slidably transition in the axial direction from a first, unlocked position to a second, locked position.

In the unlocked position (FIG. 3), slide lock 120 may be positioned proximal relative to flexible tab section 160. The unlocked position allows tab section 160 to expand radially outward to receive and mate with port 170. After receiving and interlocking with port 170, slide lock 120 may be slid distally to the locked position (FIG. 4) where slide lock 120 is positioned at least partially over flexible section 160 and physically prevents the radial expansion flexible tab 160, thereby preventing separation from port 170. In some examples, coupler 125 may provide physical compression against tab section 160 to further restrain port 170 within recess 180. Spring clip 140 may act as a stop feature with the backplate 130 to limit the distal travel of the slide lock 120.

Figure 5:
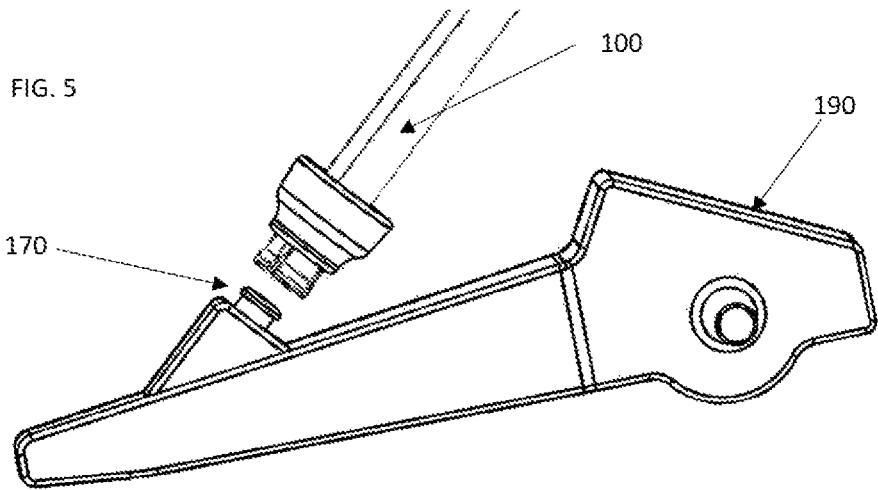
FIG. 5 is a side view of the attachment mechanism showing axial alignment with the port of a bronchoscope.
Figure 6:
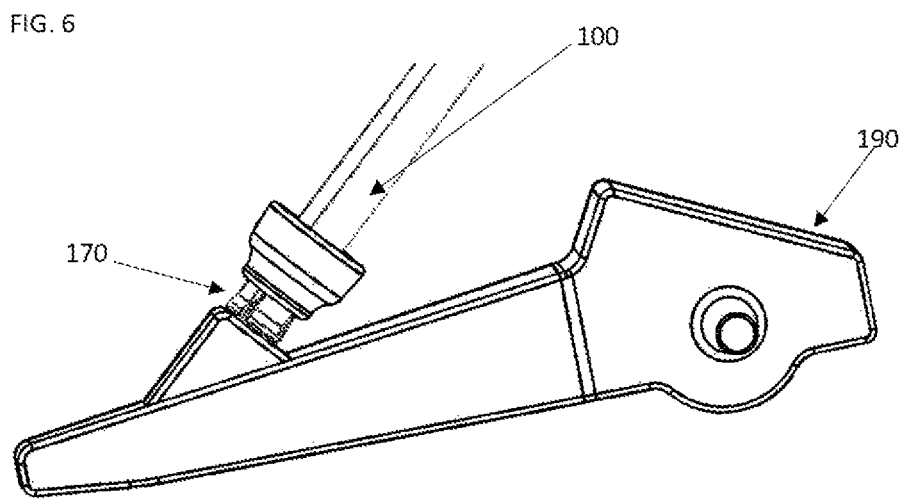
FIG. 6 is a side view of the attachment mechanism mated with the port of a bronchoscope in an unlocked configuration.
Figure 7:
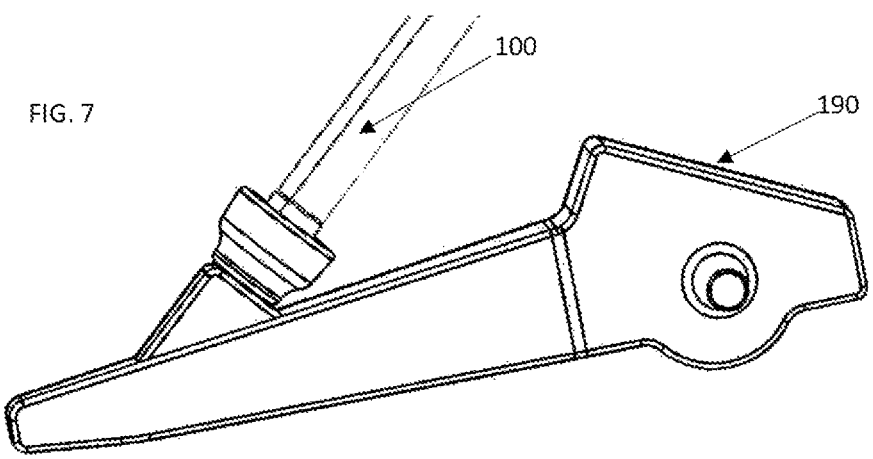
FIG. 7 is a side view of the attachment mechanism mated with the port of a bronchoscope in a locked configuration.

FIGS. 5-7 are illustrations showing a representative alignment of the attachment mechanism 100 with the handle assembly of a bronchoscope 190. Both attachment mechanism 100 and bronchoscope port 170 longitudinally (e.g., axially) aligned together (FIG. 5), with slide lock 120 in the unlocked position (e.g., pulled proximally away from the distal end), flexible tab section 160 is advanced over port 170 until the complementary and mating structures of port 170 and recess 180 are coupled together (FIG. 6). While in this position, the attachment mechanism 100 and port 170 can still be physically separated by force. To prevent separation, slide lock 120 is advanced distally over tab section 160 to the locked position (FIG. 7) where attachment mechanism 100 and port 170 cannot be physically separated unless slide lock 120 is transitioned proximally to the unlocked position.

Once coupled, a medical device 200 (e.g., treatment catheter) can be advanced through the inner lumen of adapter components 110A and 110B. The adapter components 110A and 110B provide additional support for the medical device 200 and help prevent unintentional separation between bronchoscope 190 and the medical device 200.

Figure 8:
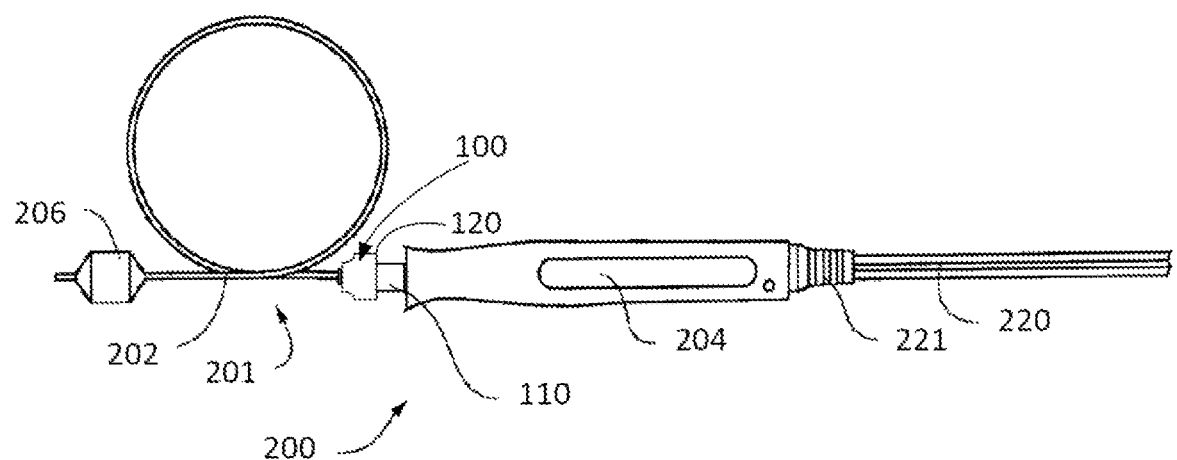
FIG. 8 is a schematic view of an example medical device configured to incorporate the disclosed attachment mechanism.

FIG. 8 is a schematic view of an example medical device 200 configured to incorporate the disclosed attachment mechanism 100 discussed above. Medical device 200 may be in the form of a catheter and handle system 210 that includes an elongate shaft 202 and an ablation assembly 206 coupled to a first or distal end of shaft 202, a positioning handle assembly 204 coupled to a second or proximal end of shaft 202, and attachment mechanism 100 for coupling catheter assembly 201 and handle assembly 204 of device 200 to a working channel of scope 190 device. Catheter assembly 201 is further fluidly and electrically coupled to a system console (not shown), including a coolant supply and return reservoir, and an energy supply such as a RF generator, via handle assembly 204. Handle assembly 204 is configured to maneuver the distal portion or end of shaft 202 and therefore ablation assembly 206 in axial and circumferential directions during the administration of treatment.

Shaft components 110A and 110B may be received and extendable from handle assembly 206 extendable for fine axial adjustment via axial translation of handle assembly 204, and therefore catheter shaft 202, along longitudinal axis with respect to Shaft components 110A and 110B. More particularly, Shaft components 110A and 110B has an inner diameter larger than an outer diameter of the catheter's body and therefore shaft 202, such that catheter shaft 202 telescopes axially within and out of shaft components 110A and 110B to achieve axial adjustment of ablation assembly 206. A length of travel of shaft 202 with respect to shaft components 110A and 110B is chosen based on a desired length of travel of ablation assembly 206 with respect to the working end or tip of the bronchoscope.

Additional details regarding exemplary catheter and handle assemblies, as well as coupling connections between shaft components 110A and 110B and handle assembly 104 are shown and described in US Patent Application Publication No. 2016/0310210 A1, which is incorporated by reference in its entirety.

While the disclosed embodiments are primarily described in the context of an attachment mechanism 100 for medical device 200 intended to be coupled to a bronchoscope, the concepts may also be adapted to other types of devices including, but not limited to, endoscope, laparoscope, and the like. The medical device 200 comprising attachment mechanism 100 may be affixed to an endoscope, a bronchoscope, or any of a variety of delivery apparatuses. Additionally, or alternatively, the relative orientation of attachment mechanism 100 and port 170 can be reversed, though less preferred. For example, bronchoscope handle 190 can include a flexible tab section 160 and slide lock 120 configured to couple with a mating portion of the medical device.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 125(f) are not to be invoked unless the specific terms "means for" or "step for" are recited in a claim.

What is claimed is:

1. An attachment mechanism configured to couple to a receiving port of a bronchoscope, the attachment mechanism comprising:
    an adapter segment comprising a tubular body having an inner lumen and distal end, wherein the distal end includes a plurality of axial slits positioned circumferentially around the distal end to define a flexible tab section, wherein the flexible tab section defined a recess within the inner lumen configured to receive and mechanically interlock with the receiving port of the bronchoscope; and
    a slide lock positioned over the tubular body configured to slide over the tubular body between a first position that allows flexible tab section to flex radially outward to receive the receiving port within the recess, and a second position where slide lock restrains the radial expansion of flexible tab section.

2. The attachment mechanism of claim 1, further comprising a spring clip positioned over the tubular body, wherein the tubular body comprises a plurality of axially aligned segments that are held in relative position to one another by the spring clip.

3. The attachment mechanism of claim 2, wherein the spring clip is contained within a cavity defined by the slide lock.

4. The attachment mechanism of claim 3, wherein the slide lock comprises a coupler and a back plate affix together, wherein the back plate inhibits the removal of the slide lock from the tubular body.

5. The attachment mechanism of claim 1, wherein the slide lock comprises a coupler and a back plate coupled together.

6. The attachment mechanism of claim 1, wherein an outer diameter of the tubular body defines a first diameter proximal of the flexible tab section and a second diameter at the flexible tab, wherein the second diameter is larger than the first diameter.

* * * * *